United States Patent
Larson et al.

(10) Patent No.: US 11,505,319 B2
(45) Date of Patent: Nov. 22, 2022

(54) RESTRAINT ASSEMBLY FOR CARGO SYSTEM

(71) Applicant: GOODRICH CORPORATION, Charlotte, NC (US)

(72) Inventors: Wallace Harold Larson, Jamestown, ND (US); Troy Joseph Herberholz, Jamestown, ND (US); Ryan Pfau, Jamestown, ND (US); Brian Landis, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 424 days.

(21) Appl. No.: 16/740,805

(22) Filed: Jan. 13, 2020

(65) Prior Publication Data

US 2020/0148361 A1 May 14, 2020

Related U.S. Application Data

(62) Division of application No. 15/903,792, filed on Feb. 23, 2018, now Pat. No. 10,562,628, which is a division of application No. 15/368,247, filed on Dec. 2, 2016, now Pat. No. 9,932,113.

(51) Int. Cl.
*B64D 9/00* (2006.01)
*B60P 7/08* (2006.01)

(52) U.S. Cl.
CPC ............... *B64D 9/003* (2013.01); *B60P 7/08* (2013.01); *B60P 7/0815* (2013.01); *B64D 9/00* (2013.01)

(58) Field of Classification Search
CPC .. B60P 7/08; B60P 7/0815; B60P 7/13; B64D 9/003; B64D 9/00; B64D 2009/006
USPC .............................................. 410/77, 80, 92
See application file for complete search history.

(56) References Cited

U.S. PATENT DOCUMENTS

| | | | |
|---|---|---|---|
| 3,709,450 A | 1/1973 | Watts et al. | |
| 6,139,232 A | 10/2000 | Niklas | |
| 6,729,818 B1 * | 5/2004 | Yee | B60P 7/0892 410/80 |
| 7,731,460 B2 | 6/2010 | Brown et al. | |
| 8,403,606 B2 | 3/2013 | Allert | |
| 9,932,113 B1 | 4/2018 | Larson | |
| 10,562,628 B2 * | 2/2020 | Larson | B60P 7/0815 |

(Continued)

OTHER PUBLICATIONS

USPTO, Restriction Requirement dated May 9, 2017 in U.S. Appl. No. 15/368,247.

(Continued)

*Primary Examiner* — Stephen T Gordon

(74) *Attorney, Agent, or Firm* — Snell & Wilmer L.L.P.

(57) ABSTRACT

A restraint assembly includes a fitting base, a bushing, and a restraint roller disk, according to various embodiments. The fitting base includes a fitting lower surface and a fitting upper surface that is angled relative to the fitting lower surface, according to various embodiments. The fitting base may be configured to be coupled, via an anchor, to a rail upper surface of a guide rail of the cargo system. In various embodiments, the bushing is configured to be disposed about the anchor. In various embodiments, the restraint roller disk includes a roller upper surface and a roller lower surface, wherein the restraint roller disk is configured to be rotatably coupled about the bushing and the roller lower surface is configured to engage the fitting upper surface of the fitting base.

20 Claims, 6 Drawing Sheets

(56) References Cited

U.S. PATENT DOCUMENTS

2008/0089756 A1* 4/2008 Allert .................... B64D 9/003
                                                      410/80
2009/0016839 A1   1/2009 Roberts

OTHER PUBLICATIONS

USPTO, Non-Final Office Action dated Jul. 27, 2017 in U.S. Appl. No. 15/368,247.
USPTO, Notice of Allowance dated Jan. 3, 2018 in U.S. Appl. No. 15/368,247.
USPTO, Restriction/Election Requirement dated May 6, 2019 in U.S. Appl. No. 15/903,792.
USPTO, Non-Final Office Action dated Aug. 21, 2019 in U.S. Appl. No. 15/903,792.
USPTO, Notice of Allowance dated Nov. 25, 2019 in U.S. Appl. No. 15/903,792.

* cited by examiner

RESTRAINT ASSEMBLY FOR CARGO SYSTEM

CROSS REFERENCE TO RELATED APPLICATION

This application is a divisional of, claims priority to and the benefit of, U.S. Ser. No. 15/903,792 filed on Feb. 23, 2018 and entitled "RESTRAINT ASSEMBLY FOR CARGO SYSTEM." The '792 application is a divisional of, claims priority to and the benefit of, U.S. Pat. No. 9,932,113 issued on Apr. 3, 2018 (aka U.S. Ser. No. 15/368,247 filed on Dec. 2, 2016) and entitled "RESTRAINT ASSEMBLY FOR CARGO SYSTEM." Both of which are hereby incorporated by reference in their entirety for all purposes.

FIELD

The present disclosure relates to cargo management systems, and more specifically, to restraint assemblies for cargo management systems.

BACKGROUND

Conventional cargo systems typically include various tracks and rollers. For example, an aircraft cargo system may span a length of an aircraft and may be configured to load and unload aircraft cargo. Power drive units ("PDUs") convey cargo forward and aft along the aircraft on conveyance rollers which are attached to the aircraft floor structure. For example, cargo may be loaded from an aft position on an aircraft and conducted on a unit load device ("ULD") or a pallet by the cargo system to a forward position and/or, depending upon aircraft configuration, cargo may be loaded from a forward position on an aircraft and conducted by the cargo system to an aft position.

Conventional cargo systems are typically designed to vertically and/or laterally restrain the cargo, ULD, and/or pallet as it moves along a track. For example, conventional cargo restraining systems may include a continuous vertical restraint lip that extends along a side of a track. However, such conventional restraining systems can be damaged by ULD features and/or pallet tie-down fittings, among others. Additionally, conventional restraining systems may not provide sufficient vertical restraint.

SUMMARY

In various embodiments, the present disclosure provides a restraint assembly of a cargo system. The restraint assembly includes a fitting base, a bushing, and a restraint roller disk, according to various embodiments. The fitting base includes a fitting lower surface and a fitting upper surface that is angled relative to the fitting lower surface, according to various embodiments. The fitting base may be configured to be coupled, via an anchor, to a rail upper surface of a guide rail of the cargo system. In various embodiments, the bushing is configured to be disposed about the anchor. In various embodiments, the restraint roller disk includes a roller upper surface and a roller lower surface, wherein the restraint roller disk is configured to be rotatably coupled about the bushing and the roller lower surface is configured to engage the fitting upper surface of the fitting base.

In various embodiments, an angle between the fitting lower surface and an axis of rotation of the restraint roller disk is between 5 degrees and 85 degrees. In various embodiments, the restraint roller disk is configured to extend in a lateral direction beyond a rail lateral surface of the guide rail to engage and guide cargo. In various embodiments, the roller lower surface is configured to directly engage and be in rotating-sliding contact with the fitting upper surface of the fitting base. The roller upper surface and the roller lower surface of the restraint roller disk may be substantially parallel to each other. For example, the restraint roller disk may include a radially outward edge portion and the radially outward edge portion may have a frustoconical tapered surface extending at least partially between the roller upper surface and the roller lower surface.

Also disclosed herein, according to various embodiments, is a cargo system that includes a guide rail and a restraint assembly. The guide rail may include a rail upper surface and a rail lateral surface. The restraint assembly may include a restraint roller disk rotatably coupled to the rail upper surface of the guide rail, wherein the restraint roller disk is disposed in an angled orientation relative to the rail lateral surface.

In various embodiments, an angle between the rail lateral surface and an axis of rotation of the restraint roller disk is between 5 degrees and 85 degrees. In various embodiments, the restraint roller disk extends in a lateral direction beyond the rail lateral surface of the guide rail to engage and guide at least one of cargo and a cargo shuttle. The restraint assembly may further include an anchor, a fitting base, and a bushing. The fitting base may include a fitting lower surface and a fitting upper surface that is angled relative to the fitting lower surface, wherein the fitting base is coupled, via the anchor, to the rail upper surface of the guide rail. The bushing may be disposed about the anchor, wherein the restraint roller disk is rotatably coupled about the bushing.

The bushing may include a bushing upper surface that is perpendicular with a longitudinal axis of the anchor for engaging at least one of a head and a washer of the anchor. For example, the bushing upper surface, the fitting lower surface, and the rail upper surface may be parallel to each other and may be perpendicular to the rail lateral surface. In various embodiments, the restraint roller disk includes a roller upper surface and a roller lower surface, wherein the roller lower surface engages the fitting upper surface of the fitting base.

In various embodiments, the roller lower surface is in rotating-sliding contact with the fitting upper surface of the fitting base. In various embodiments, the roller upper surface and the roller lower surface of the restraint roller disk are substantially parallel to each other. In various embodiments, the restraint roller disk has a radially outward edge portion that has a frustoconical tapered surface extending at least partially between the roller upper surface and the roller lower surface. In various embodiments, a segment of the frustoconical tapered surface is substantially parallel with the fitting lower surface and the rail upper surface. In various embodiments, the segment of the frustoconical tapered surface is disposed lower than the fitting lower surface and the rail upper surface. The restraint roller disk may be made from a metallic material.

Also disclosed herein, according to various embodiments, is a method for restraining a cargo shuttle. The method may include moving the cargo shuttle along a track of a cargo system and utilizing a restraint roller disk to vertically restrain the cargo shuttle as it moves along the track of the cargo system. An angle between an axis of rotation of the restraint roller disk and the track of the cargo system may be between 5 degrees and 85 degrees.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1A:
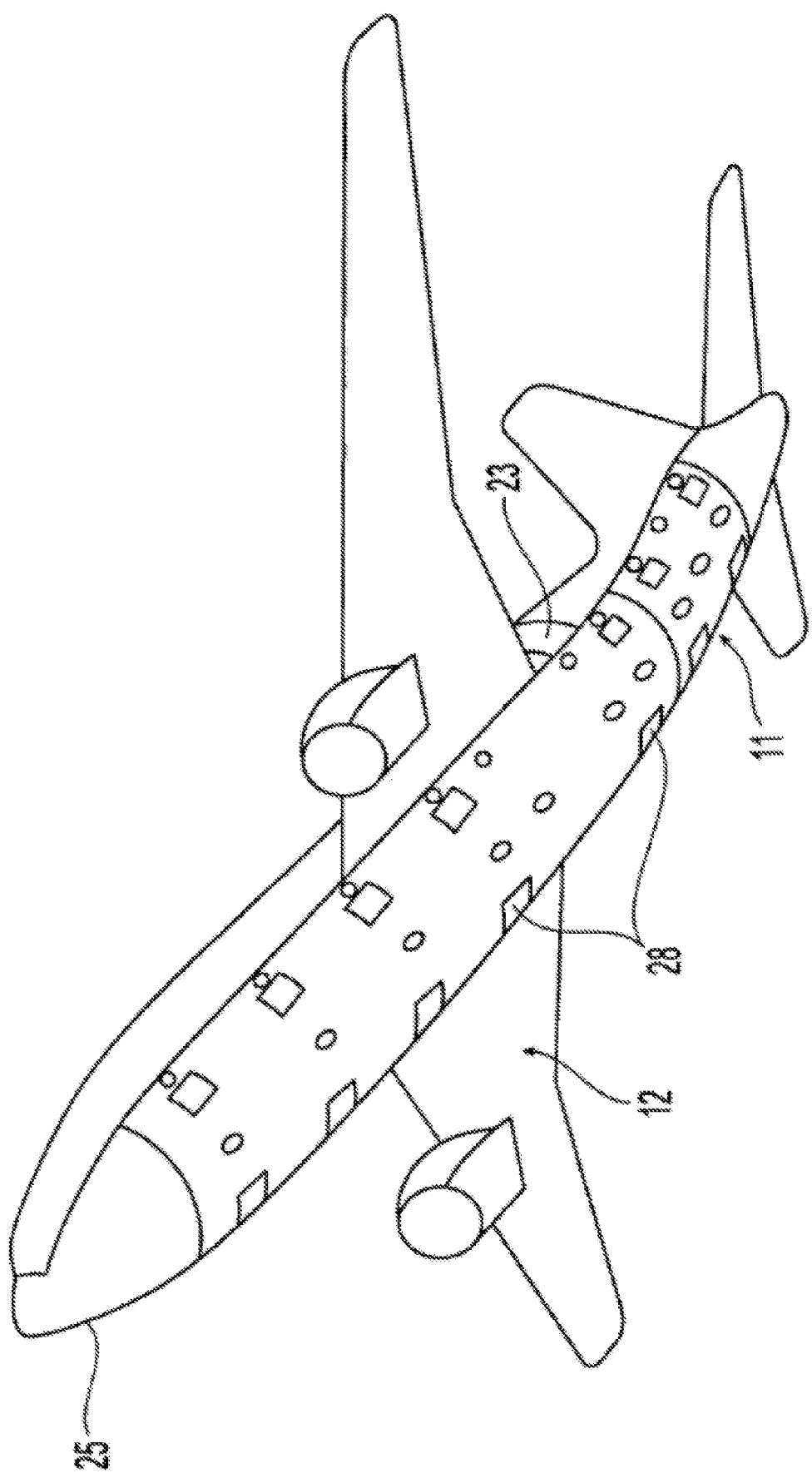
FIGS. 1A and 1B illustrate a cargo system of an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Cargo management systems, as disclosed herein, are used to load, move, and unload cargo. While numerous examples and details are included below with reference to aircraft cargo systems, it is expected that the present disclosure may apply to other, non-aircraft type cargo systems.

Figure 1B:
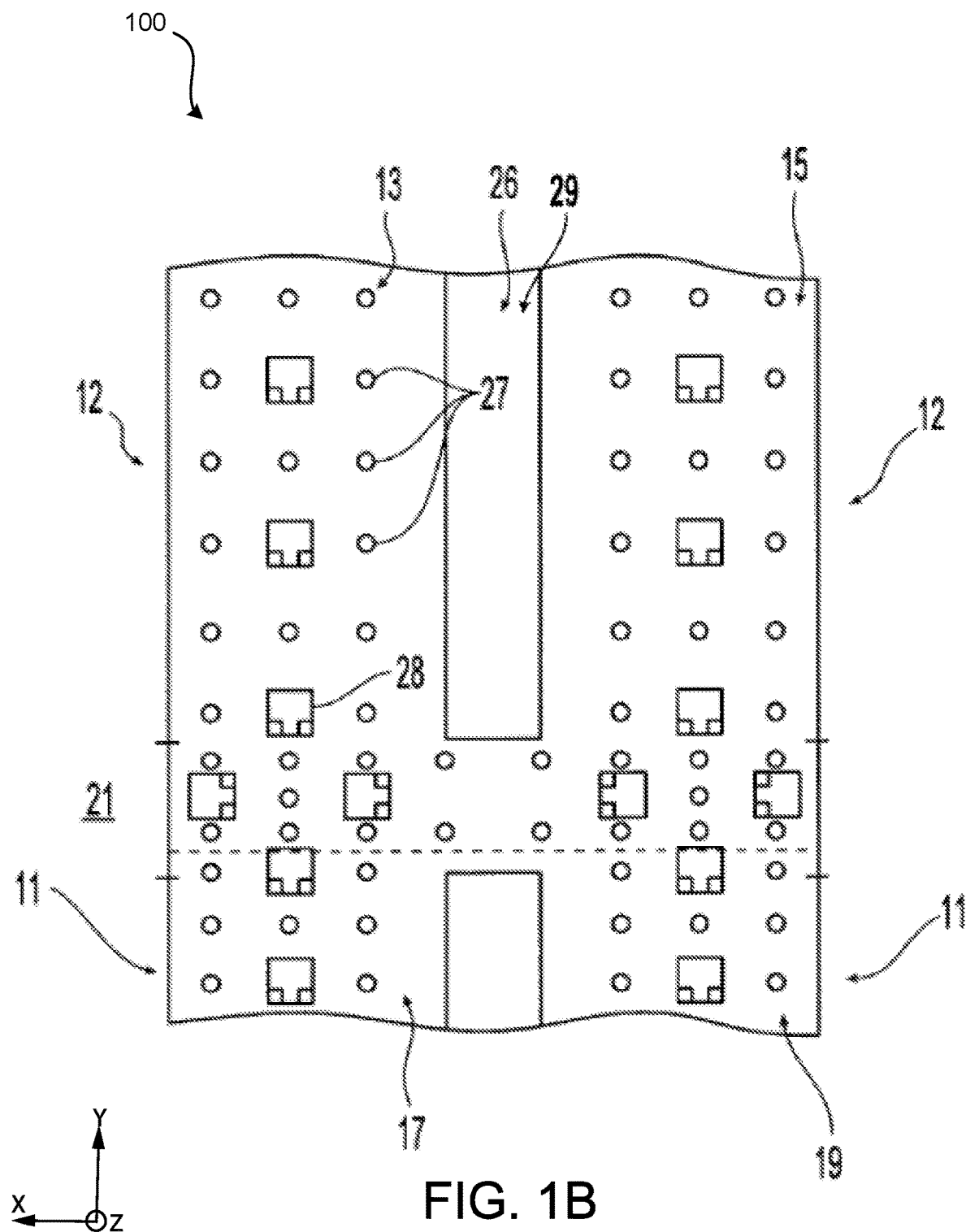
Figure 2A:
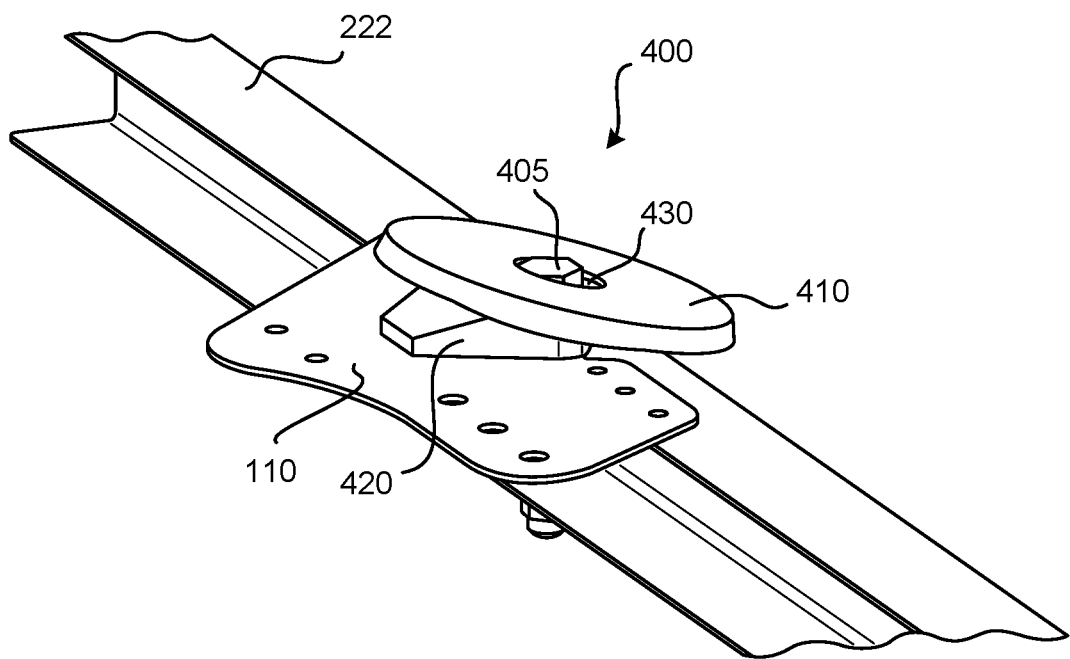
FIGS. 2A and 2B illustrate perspective views of a restraint assembly of a cargo system, in accordance with various embodiments.

FIG. 1A illustrates an underside of an aircraft 25 and FIG. 2A illustrates an aircraft cargo deck 29 that can be used to implement various embodiments of the present disclosure. A generally H-shaped conveyance surface 26 forms a deck of an aircraft, adjacent a cargo bay loading door 23. However, there are many other aircraft cargo deck configurations to which the embodiments of the disclosure can be implemented. For example, various aircraft, particularly those configured primarily for the transportation of cargo without passengers, have the upper passenger deck removed and an additional larger cargo deck installed. Other aircraft may have three or more parallel longitudinal tracks rather than the H-shape shown in FIG. 1B.

The cargo compartment includes a cargo loading system comprising a plurality of freely rotating conveyance rollers 27 mounted in the cargo deck to define the conveyance plane. Cargo loaded onto the aircraft cargo deck can be moved manually throughout the cargo bay upon the freely rotating conveyance rollers. However, it is desirable to electro-mechanically propel the cargo with minimal or no manual assistance. In that regard, the H-shaped cargo surface includes a number of PDUs 28 that provide a mechanism upon which cargo is propelled over the conveyance rollers 27. Each PDU 28 typically includes a drive roller element which can be raised from a lowered position beneath the cargo deck to an elevated position. These PDUs are referred to as "self-lift" PDUs. In the elevated position, the drive roller element contacts and drives the overlying cargo that rides on the conveyance rollers. Other types of PDUs, which can also be used as embodiments of the present disclosure, are above the conveyor plane all the time and held up by a spring. These PDUs are referred to as "spring-lift" PDUs.

In the longitudinal direction, the H-shaped conveyance surface 26 includes a left track and a right track along which cargo is to be stowed in parallel columns during flight. In the transverse direction, the cargo deck is also separated into a tail (or "aft") section 11 and a forward section 12. Thus, the left and right tracks are divided into four sections, two forward sections 13 and 15 and two aft sections 17 and 19. In addition to the four sections, there is an additional path 21 between both tracks at the cargo bay loading door 23. This additional path 21 divides the cargo bay between the forward section 12 and aft section 11. This path is used to move cargo into and out the aircraft, and also to transfer cargo between the left and right storage tracks.

In one embodiment, a human operator manipulates control elements to selectively and electrically energize PDUs 28 in each of the five aforementioned sections 13, 15, 17, 19 and 21. Typically, these controls are mounted in an operator interface unit. The control elements may be mounted on a wall or other structure within the cargo bay or may be portable, e.g., the controls may be in a hand held pendant. These controls will typically have an on/off switch and a joystick which, depending on the direction pushed, will energize a set of PDUs 28, causing groups of drive roller elements to be elevated (if not already elevated) and rotated in one of two possible directions (i.e., forward or reverse). A section of PDUs will remain energized as long as the joystick is held in a corresponding position. In response to release of the joystick, the selected set of PDUs is de-energized. In the case of self-lifting PDUs, the drive roller elements are returned to their retracted position below the plane of the conveyance rollers 27; in the case of spring-lift PDUs, the PDUs remain biased in the upward position and brakes are applied to hold the cargo containers in place.

The cargo system 100 may include one or more cargo shuttles that are configured to slide across floor panels or roll across the conveyance rollers 27. The cargo shuttles may be unit load devices ("ULD"), pallets, or other components on which cargo may be secured. In various embodiments, the cargo system 100 includes guide rails that are configured to guide the cargo shuttles. For example, guide rails may be disposed along the aforementioned sections of the conveyance surface 26 and/or may be disposed along the cargo tracks to restrict and restrain the movement of the cargo shuttles. The guide rails may be coupled/mounted to an airframe of the aircraft. In various embodiments, one or more restraint assemblies 400 (with reference to FIGS. 2A and 2B) are coupled to the guide rails to facilitate vertical restraint (z axis) and lateral restraint (x axis) of the cargo shuttles along and across the conveyance surface 26.

Figure 2B:
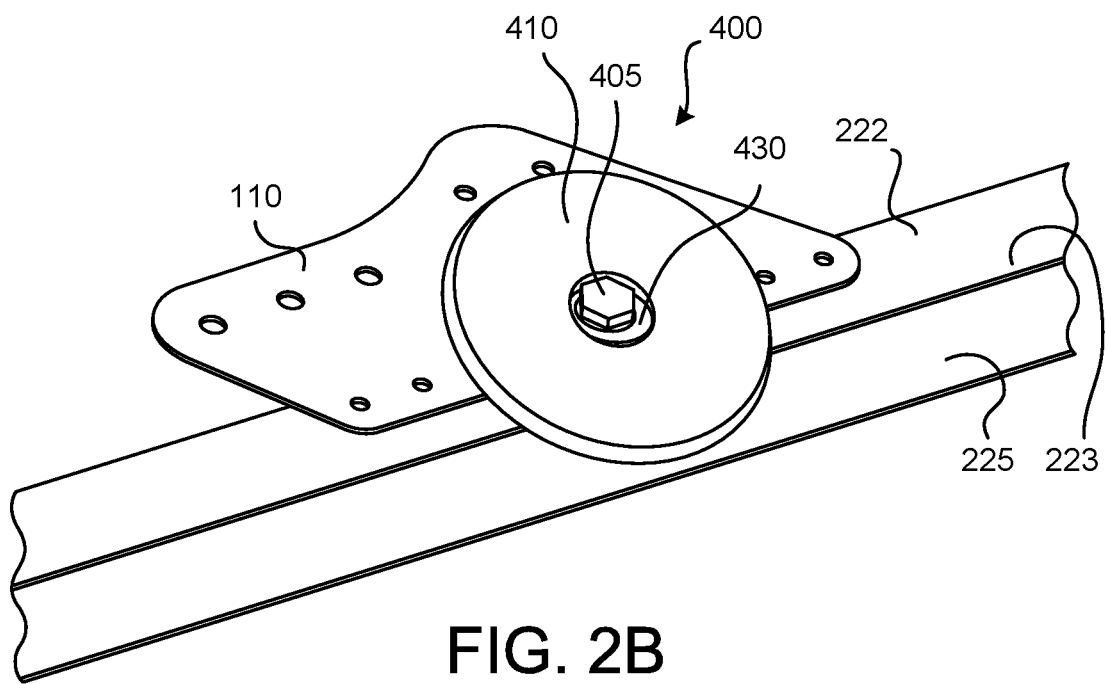

With continued reference to FIGS. 2A and 2B, the restraint assembly 400 generally includes a restraint roller disk 410 that is rotatably coupled to the guide rail 222. In various embodiments, the guide rail 222 includes a rail upper surface 223 and a rail lateral surface 225. The restraint roller disk 410 may be coupled to the rail upper surface 223 of the guide rail 222 and the restraint roller disk 410 may be disposed in an angled orientation relative to the rail lateral surface 225. The restraint roller disk 410 may be made from a metallic material, among others. For example, the restraint roller disk 410 may be made from steel, aluminum, or alloys thereof.

In various embodiments, an angle between the rail lateral surface 225 (which is parallel to the z axis) and an axis of rotation 419 (with momentary reference to FIG. 4) of the restraint roller disk 410 is between 1 degree and 89 degrees. In other words, and according to various embodiments, the restraint roller disk 410 does not rotate about a horizontal axis (x axis or y axis) nor a vertical axis (z axis), but instead rotates about an oblique axis 419. In various embodiments, the angle between the rail lateral surface 225 and the axis of rotation 419 (with momentary reference to FIG. 4) is between 5 degrees and 85 degrees. In various embodiments, the angle between the rail lateral surface 225 and the axis of rotation 419 (with momentary reference to FIG. 4) is between 10 degrees and 80 degrees.

As described in greater detail below, the restraint assembly 400 may also include an anchor 405, a fitting base 420 coupled/mounted to the airframe 110 of the aircraft, and a bushing 430 that is disposed about the anchor 405. Also, as described in greater detail below, the angled orientation of the restraint roller disk 410 of the restraint assembly 400 generally provides vertical restraint to lips/edges of cargo shuttles while also preventing protruding features 515 of the cargo shuttle 514 (with momentary reference to FIG. 5) from being hindered or caught on the restraint assembly 400. In other words, the restraint roller disk extends in a lateral direction (x axis) beyond the rail lateral surface 225 to engage and guide the cargo or the cargo shuttle 114. Accordingly, the angled orientation of the restraint roller disk 410 together with the rotatable configuration of the restraint roller disk 410 generally improves operation of the cargo system 100 and/or prevents damage to the cargo system 100.

In various embodiments, the fitting base 420 may be disposed between the restraint roller disk 410 and the guide rail 222. In various embodiments, the fitting base 420 is a portion of the airframe 110 of the aircraft. In various embodiments, the fitting base 420 is a separate component from the airframe 110. The fitting base 420 may include a fitting lower surface 424 that is coupled to and in contact with the rail upper surface 223 of the guide rail 222. The fitting base 420 may also include a fitting upper surface 422 that is angled relative to the fitting lower surface 424 and thus imparts, at least partially, the angled orientation to the restraint roller disk 410. In other words, the fitting upper surface 422 of the fitting base 420 may directly engage and be in rotating-sliding contact with a roller lower surface 414 of the restraint roller disk 410 to support rotation of the restraint roller disk 410 about the axis of rotation 419 in the angled orientation.

Figure 3:
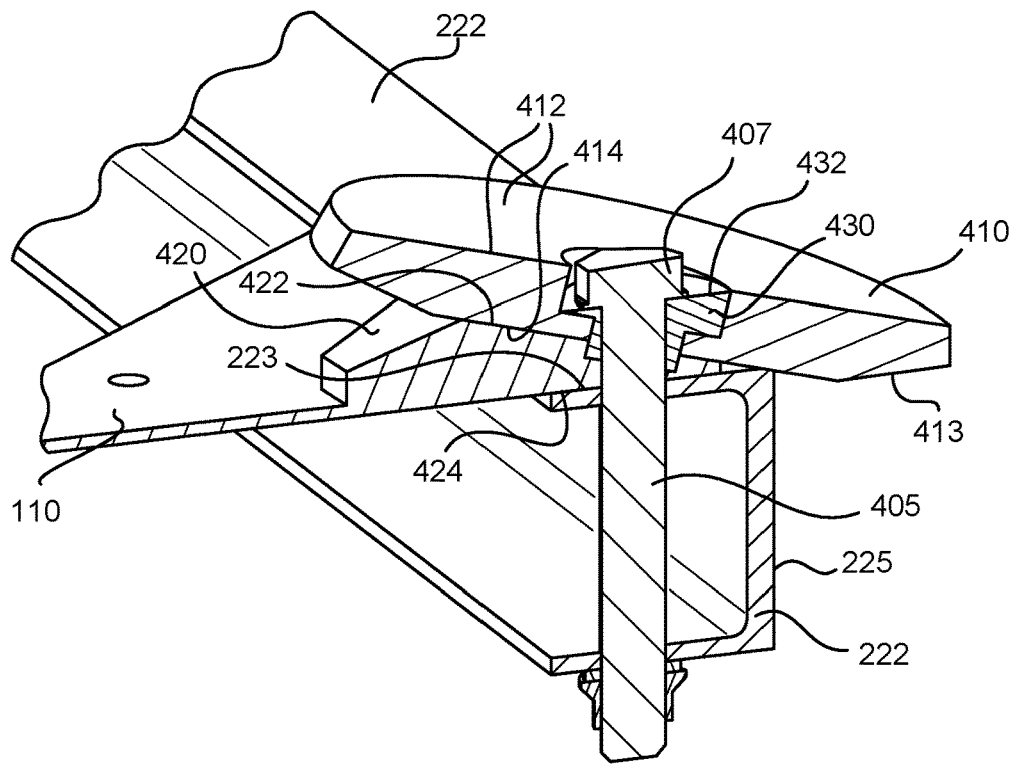
FIG. 3 illustrates a perspective cross-sectional view of a restraint assembly of a cargo system, in accordance with various embodiments.
Figure 4:
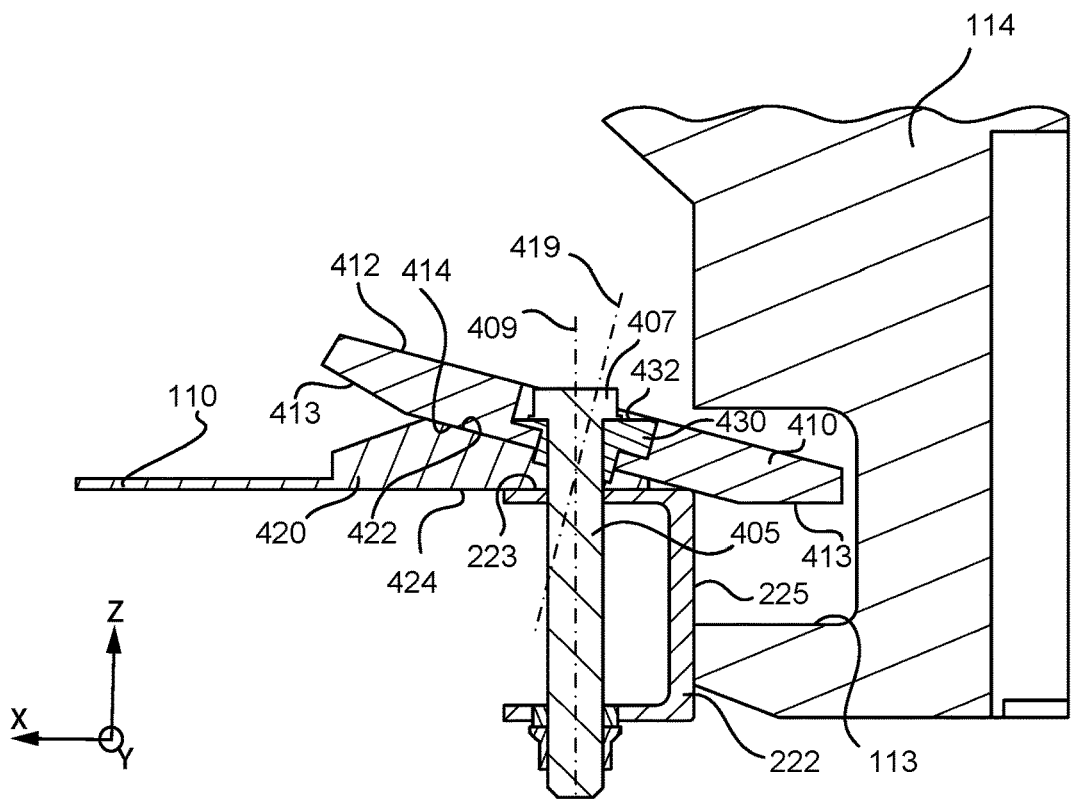
FIG. 4 illustrates a cross-sectional view of the restraint assembly of FIG. 3, in accordance with various embodiments.

In various embodiments, and with reference to FIGS. 3 and 4, the restraint roller disk 410 is rotatably disposed about the bushing 430, which is disposed about the anchor 405. The restraint roller disk 410 can rotate about the bushing 430 in response to cargo and/or the cargo shuttle 114 contacting the restraint roller disk 410 as the cargo and/or cargo shuttle 114 moves along a track of the cargo system 100. In various embodiments, the bushing 430 is non-rotatably coupled/attached to the anchor 405. In various embodiments, the bushing 430 has a bushing upper surface 432 that is perpendicular with a longitudinal axis 409 of the anchor 405. The bushing upper surface 432 may provide a surface against which a head 407 of the anchor 405 (or a washer/nut of the anchor) may be seated for mounting the restraint assembly 400 to the guide rail 222 and/or airframe 110 of the aircraft.

In various embodiments, the bushing upper surface 432 of the bushing 430, the fitting lower surface 424 of the fitting base 420, and the rail upper surface 223 of the guide rail 222 are parallel to each other and are perpendicular to the rail lateral surface 225 of the guide rail 222. In various embodiments, the roller upper surface 412 and the roller lower surface 414 of the restraint roller disk 410 are substantially parallel to each other. In such embodiments, the angled orientation of the restraint roller disk 410 is generally the same as the angled orientation between the fitting upper surface 422 and the fitting lower surface 424.

In various embodiments, a radially outward edge portion of the restraint roller disk 410 has a frustoconical tapered surface 413 that extends at least partially between the roller upper surface 412 and the roller lower surface 414. This frustoconical tapered surface 413 may facilitate improved engagement with the cargo shuttle 114. For example, a segment of the frustoconical tapered surface 413 may be substantially parallel with a lip 113 of the cargo shuttle 114 (and parallel with the fitting lower surface 424 and the rail upper surface 223) and thus may facilitate a secure vertical restraint of the cargo shuttle 114. While FIG. 4 shows a gap between the lip 113 of the cargo shuttle 114 and the restraint roller disk 410, during operation of the cargo system 100 the cargo shuttle may be susceptible to vertical movement. Accordingly, if the lip 113 of the cargo shuttle 114 is higher than the rail upper surface 223 of the guide rail 222, as the cargo shuttle 114 approaches the restraint assembly 400 the lip 113 may engage the restraint roller disk 410. As the cargo shuttle 114 continues to move along the track, the restraint roller disk 410 rotates and guides the lip 113 downwards vertically restrain the cargo shuttle 114. In various embodiments, the segment of the frustoconical tapered surface 413 is disposed lower than the fitting lower surface 424 of the fitting base 420 and the rail upper surface 223 of the guide rail 222.

Figure 5:
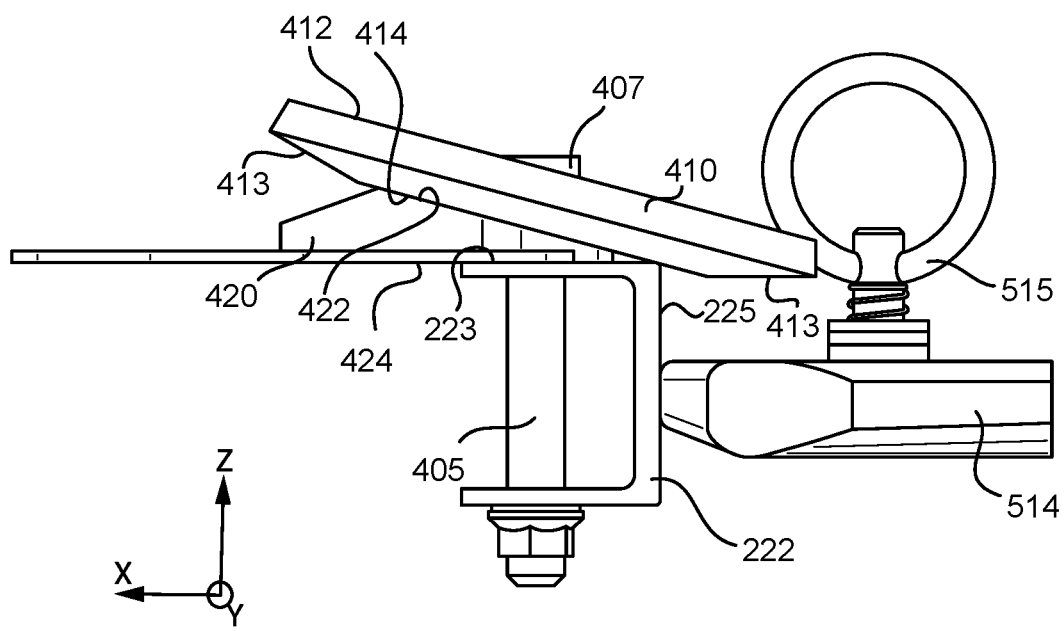
FIG. 5 illustrates a perspective view of a restraint assembly of a cargo system, in accordance with various embodiments.

In various embodiments, and with reference to FIG. 5, the restraint roller disk 410 may be configured to provide a degree of lateral restraint by laterally guiding features 515 protruding from the cargo shuttle 514. For example, the cargo shuttle 514 may be a pallet and one or more fasteners, straps, tie-downs, etc., may extend from the pallet. The restraint assembly 400 may prevent such features 515 from becoming caught or snagged during movement of the cargo shuttle 514 along the cargo system. In other words, the restraint roller disk 410 may, in addition to the vertical restraint described above, provide lateral restraint to the cargo shuttle 514 and thus may prolong the operational life of the cargo system 100 and/or prevent damage to cargo.

Figure 6:
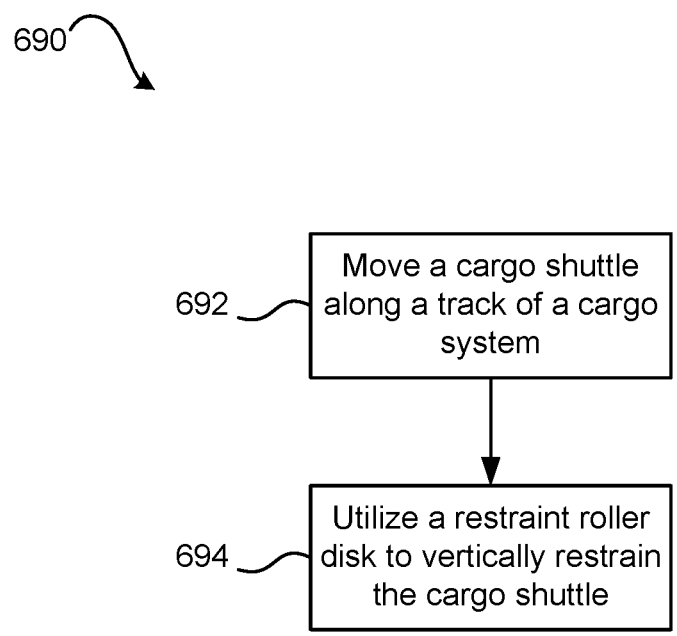
FIG. 6 is a schematic flow chart diagram of a method of restraining a cargo shuttle, in accordance with various embodiments.

In various embodiments, and with reference to FIG. 6, a method 690 for restraining a cargo shuttle is provided. The method 690 includes moving the cargo shuttle along a track of the cargo system at step 692 and utilizing a restraint roller disk to vertically restrain the cargo shuttle at step 694. In various embodiments an angle between an axis of rotation of the restraint roller disk and the track of the cargo system is between 1 degree and 89 degrees. In various embodiments, the angle between the axis of rotation of the restraint roller disk and the track of the cargo system is between 5 degrees and 85 degrees. In various embodiments, the angle between the axis of rotation of the restraint roller disk and the track of the cargo system is between 10 degrees and 80 degrees.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for restraining a cargo shuttle, the method comprising:
    moving the cargo shuttle along a track of a cargo system; and
    utilizing a restraint roller disk to vertically restrain the cargo shuttle as it moves along the track of the cargo system, wherein an angle between an axis of rotation of the restraint roller disk and the track of the cargo system is between 5 degrees and 85 degrees, wherein the restraint roller disk is monolithic and is configured to both engage and guide the cargo shuttle, and wherein the restraint roller disk includes a segment that is disposed vertically lower than a lower mounting point of the restraint roller disk.

2. The method of claim 1, wherein the cargo system comprises:
    a guide rail comprising a rail upper surface and a rail lateral surface;
    a restraint assembly comprising the restraint roller disk rotatably coupled to the rail upper surface of the guide rail;
    an anchor;
    a fitting base comprising a fitting lower surface and a fitting upper surface that is angled relative to the fitting lower surface, wherein the fitting base is coupled, via the anchor, to the rail upper surface of the guide rail; and
    a bushing disposed about the anchor, wherein the restraint roller disk is rotatably coupled about the bushing.

3. The method of claim 2, wherein the restraint roller disk extends in a lateral direction beyond the rail lateral surface of the guide rail to engage and guide at least one of cargo and a cargo shuttle.

4. The method of claim 2, wherein the bushing comprises a bushing upper surface that is perpendicular with a longitudinal axis of the anchor for engaging at least one of a head and a washer of the anchor.

5. The method of claim 4, wherein the bushing upper surface, the fitting lower surface, and the rail upper surface are parallel to each other and are perpendicular to the rail lateral surface.

6. The method of claim 2, wherein the restraint roller disk comprises a roller upper surface and a roller lower surface, wherein the roller lower surface engages the fitting upper surface of the fitting base.

7. The method of claim 6, wherein the roller lower surface is in rotating-sliding contact with the fitting upper surface of the fitting base.

8. The method of claim 6, wherein the roller upper surface and the roller lower surface of the restraint roller disk are substantially parallel to each other.

9. The method of claim 8, wherein the restraint roller disk comprises a radially outward edge portion, wherein the radially outward edge portion comprises a frustoconical tapered surface extending at least partially between the roller upper surface and the roller lower surface.

10. The method of claim 9, wherein a segment of the frustoconical tapered surface is substantially parallel with the fitting lower surface and the rail upper surface.

11. The method of claim 10, wherein the segment of the frustoconical tapered surface is disposed lower than the fitting lower surface and the rail upper surface.

12. The method of claim 2, wherein the restraint roller disk is made from a metallic material.

13. The method of claim 2, wherein the angle is between the axis of rotation of the restraint roller disk and the fitting lower surface.

14. The method of claim 6, wherein the roller lower surface is configured to directly engage and be in rotating-sliding contact with the fitting upper surface of the fitting base.

15. The method of claim 14, wherein the roller upper surface and the roller lower surface of the restraint roller disk are substantially parallel to each other.

16. The method of claim 15, wherein the restraint roller disk comprises a radially outward edge portion, wherein the radially outward edge portion comprises a frustoconical tapered surface extending at least partially between the roller upper surface and the roller lower surface.

17. The method of claim 12, wherein the metallic material includes steel, aluminum, or alloys thereof.

18. The method of claim 1, wherein the cargo shuttle is restrained laterally by the restraint roller disk being disposed in an angled orientation.

19. The method of claim 2, wherein the cargo shuttle is restrained laterally by the guide rail lateral surface.

20. The method of claim 2, wherein the restraint assembly is a first restraint assembly coupled to a first guide rail, the cargo system further comprising:
a second restraint assembly coupled to a second guide rail, the cargo system being mounted in an aircraft.

* * * * *